United States Patent
Chen et al.

(10) Patent No.: US 11,514,321 B1
(45) Date of Patent: Nov. 29, 2022

(54) ARTIFICIAL INTELLIGENCE SYSTEM USING UNSUPERVISED TRANSFER LEARNING FOR INTRA-CLUSTER ANALYSIS

(71) Applicant: Amazon Technologies, Inc., Seattle, WA (US)

(72) Inventors: Xianshun Chen, Seattle, WA (US); Zahed Patel, Seattle, WA (US); Kai Liu, Bothell, WA (US); Nikhil Anand Navali, Seattle, WA (US); Archiman Dutta, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 16/900,620

(22) Filed: Jun. 12, 2020

(51) Int. Cl.
*G06E 1/00* (2006.01)
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC . G06T 7/20; G06T 7/246; G06T 2207/20081; G06T 2207/20084; G06K 9/6256; G06N 3/0454; G06N 3/08; G06N 3/006
See application file for complete search history.

(56) References Cited

U.S. PATENT DOCUMENTS

| | | | |
|---|---|---|---|
| 6,169,969 | B1 | 1/2001 | Cohen |
| 6,327,561 | B1 | 12/2001 | Smith et al. |
| 6,363,381 | B1 | 3/2002 | Lee et al. |
| 6,697,998 | B1 | 2/2004 | Damerau et al. |
| 7,644,102 | B2 | 1/2010 | Gaussier et al. |
| 7,644,127 | B2 | 1/2010 | Yu |
| 7,912,705 | B2 | 3/2011 | Wasson et al. |
| 8,140,491 | B2 | 3/2012 | Mandagere et al. |
| 8,200,640 | B2 | 6/2012 | Arasu et al. |
| 8,321,648 | B2 | 11/2012 | Condict |
| 8,407,164 | B2 | 3/2013 | Malik et al. |
| 10,303,797 | B1 | 5/2019 | Menezes et al. |
| 10,535,017 | B2 * | 1/2020 | Johnson ................. G06F 16/35 |

(Continued)

FOREIGN PATENT DOCUMENTS

| | | | | |
|---|---|---|---|---|
| CN | 108268883 | A | * 7/2018 | ........... G06K 9/6202 |
| CN | 110462606 | A | * 11/2019 | ............. G06F 16/35 |
| CN | 110489750 | A | * 11/2019 | |

OTHER PUBLICATIONS

Hong Wang et al., "Self-Supervised Learning for Contextualized Extractive Summarization", dated Jun. 11, 2019, pp. 1-7.

(Continued)

*Primary Examiner* — Xin Jia

(74) *Attorney, Agent, or Firm* — Robert C. Kowert; Kowert, Hood, Munyon, Rankin & Goetzel, P.C.

(57) ABSTRACT

Entity record pairs are extracted from a selected cluster of entity records. Attribute value pairs are obtained from the entity record pairs. Labels are assigned to the attribute value pairs based at least in part on entity-level similarity scores of the entity records from which the attribute value pairs were obtained. A machine learning model is trained, using a data set which includes at least some attribute value pairs to which the labels are assigned, to generate attribute similarity scores for pairs of attribute values.

20 Claims, 9 Drawing Sheets

(56) References Cited

U.S. PATENT DOCUMENTS

| | | |
|---|---|---|
| 10,552,735 B1 * | 2/2020 | Widerhorn ............. G06N 20/10 |
| 10,565,498 B1 | 2/2020 | Zhiyanov |
| 2007/0239745 A1 | 10/2007 | Guerraz et al. |
| 2009/0037440 A1 | 2/2009 | Will et al. |
| 2018/0150724 A1 | 5/2018 | Brock |

OTHER PUBLICATIONS

Wei Zhang et al., "AutoBlock: A Hands-off Blocking Framework for Entity Matching", dated Dec. 7, 2019. pp. 1-10.
U.S. Appl. No. 16/902,055, dated Jun. 15, 2020, Karim Bouyarmane.
U.S. Appl. No. 17/002,274 dated Aug. 25, 2020, Yifan Xu.
U.S. Appl. No. 16/817,218, dated Mar. 12, 2020, Dmitry Vladimir Zhiyanov.
U.S. Appl. No. 16/808,162, dated Mar. 3, 2020, Xianshun Chen.
Yuting Song et al, "Metadata Similarity Calculation in Cross-Language Record Linkage based on Cross-Lingual Embedding Models", dated 2019, pp. 1-7.
William W. Cohen et al, "A Comparison of String Metrics for Matching Names and Records", dated 2003, pp. 1-6.
Yichao Lu et al, "A neural interlingua for multillingual machine translation", dated Oct. 16, 2018, pp. 1-9.
IvVan P. Fellegi et al, "A Theory for Record Linkage", dated Dec. 1969, vol. 64, No. 328, pp. 1183-1210.
Xiaonan Zhao et al, "A weakly supervised adaptive triplet loss for deep metric learning", pp. 1-4.
Ashish Vaswani et al, "Attention Is All You Need", dated 2017, 31st Conference on Neural Information Processing Systems, pp. 1-11.
Yoon Kim, "Character-Aware Neural Language Models", dated 2016, pp. 1-9.
Oyku Ozlem Cakal et al,"CLRL: Feature Engineering for Cross-Language Record Linkage", dated 2019, pp. 1-4.
Yoon Kim "Convolutional Neural Networks for Sentence Classification", dated Sep. 3, 2014, pp. 1-6.
Yuting Song et al, "Cross-Language Record Linkage based on Semantic Matching of Metadata", dated Mar. 2019, DBSJ Journal vol. 17 No.1, pp. 1-8.
Sidharth Mudgal et al, "Deep Learning for Entity Matching: A Design Space Exploration", dated Jun. 10-15, 2018, pp. 1-16.
Ahmed K. Elmagamid et al, "Duplicate Record Detection: A Survey", dated Jan. 2007, IEEE Transactions on knowledge and data engineering, vol. 19, No. 1, pp. 1-16.
Wang Ling et al, "Finding Function in Form: Compositional Character Models for Open Vocabulary Word Representation", dated May 23, 2016, pp. 1-11.
Melvin Johnson et al, "Google's Multilingual Neural Machine Translation System: Enabling Zero-Shot Translation", vol. 5. pp 339-351, dated 2017.
Vincenzo Di Cicco et al, "Interpreting Deep Learning Models for Entity Resolution: An Experience Report Using Lime", dated Jul. 5, 2019, pp. 1-4.
Holger Schwenk et al, "Learning Joint Multilingual Sentence Representations with Neural Machine Translation", dated Aug. 8, 2017, pp. 1-11.
Arijit Biswas et al, "MRNet-Product2Vec: A Multi-Task Recurrent Neural Network for product Embeddings", dated Sep. 21, 2017, pp. 1-5.
Orhan Firat et al, "Multi-Way, Multilingual Neural Machine Translation with a Shared Attention Mechanism", dated Jan. 6, 2016, pp. 1-10.
Adam Paszke et al, "PyTorch: An Imperative Style, High-Performance Deep Learning Library", 33rd Conference on Neural Information processing system, pp. 1-12.
Halbert L. Dunn et al, "Record Linkage", Dated May 10, 1946, pp. 1-5.
Adelene Y.I. Sim et al, "Record2Vec: Unsupervised Representation Learning for Structured Records", pp. 1-6.
Nils Reimers et al, "Sentence-BERT: Sentence Ebeddings using Siamese BERT-Networks", dated Aug. 27, 2019, pp. 1-11.
Hanna Kopcke et al, "Tailoring entity resolution for matching product offers", dated Mar. 26-30, 2012, pp. 1-12.
Sebastian Klenk et al, "The Normalized Compression Distance as a Distance Measure in Entity Identification", dated Apr. 8, 2010, pp. 1-17.
Edourd Grave et al, "Unsupervised Alignment of Embeddings with Wassertein Procrustes", dated May 29, 2018, pp. 1-11.
Jane Bromley, et al., "Signature Verification using a "Siamese" Time Delay Neural Network", AT&T Bell Laboratories, 1994, pp. 737-744.
Oriol Vinyals, et al., "Matching Networks for One Shot Learning", In Advances in Neural Information Processing Systems, 2016, pp. 1-12.
Jordan Burgess, et al., "One-Shot Learning in Discriminative Neural Networks", Workshop on Bayesian Deep Learning, NIPS 2016, pp. 1-3.
Anonymous, "Classification—TensorFlow", Retrieved from URL: https://www.tensorflow.org/versions/r0.10/api_docs/python/nn/classification#tsigmoid_cross_entropy_with_logits on Feb. 15, 2017, pp. 1-5.
Wikipedia, "Keras", Retrieved from URL: https://en.wikipedia.org/wiki/Keras on Feb. 15, 2017, pp. 1-2.
Amazon Web Services, "Amazon Machine Learning—Developer Guide Version Latest", Updated Aug. 2, 2016, pp. 1-146.
Gregory Koch, et al., "Siamese Neural Networks for One-shot Image Recognition", In Proceeding of the 32nd International Conference on Machine Learning, JMLR: W &CP vol. 37, 2015, pp. 1-8.
Colah's Blog, "Understanding LSTM Networks", Posted on Aug. 27, 2015, pp. 1-22.
Sergei Dobroshinksy et al., "Integrate and deduplicate datasets using AWS Lake Formation FindMatches", AWS Big Data Blog, Retrieved from https://aws.amazon.com/blogs/big-data/integrate-and-deduplicate-datasets-using-aws-lake-formation-findmatches/, Feb. 5, 2020, pp. 1-24.
Russell Reas et al., "SuperPart: Supervised graph partitioning for record linkage", The 44th International Conference on the Very Large Data Bases, Proceedings of the VLDB Endowment, vol. 11, No. 5, Aug. 2018, pp. 1-10.
Hossein Esfandiari et al, "Parallel and Streaming Algorithms for K-Core Decomposition", dated Nov. 23, 2018, pp. 1-13.
Unknown "Graphstream—The Connected Components Algorithm", pp. 1-4.
Unknown "Kruskal's Algorithm", pp. 1-8.
Wissam Khaouid et al, "K-Core Decomposition of Large Networks on a Single PC", Proceedings of the VLDB Endowment, vol. 9, No. 1, dated 2015, pp. 1-11.
Unknown "Single-Linkage Clustering", pp. 1-6.
Wikipedia "Minimum Spanning Tree", pp. 1-15.
Yarin Gal et al, "A Theoretically Grounded Application of Dropout in Recurrent Neural Networks", (30th Conference on Neural information Processing Systems), pp. 1-9.
George Papadakis et al, "Comparative Analysis of Approximate Blocking Techniques for Entity Resolution", dated 2016, pp. 1-12.
Andrew Arnold et al, "A Comparative Study of Methods for Transductive Transfer Learning", pp. 1-11.
Jacob Devlin et al, "BERT: Pre-Training of Deep Bidirectional Transformers for Language Understanding", dated May 24, 2019, pp. 1-16.
Maithra Raghu et al, "Transfusion: Understanding Transfer Learning for Medical Imaging", dated 2019, pp. 1-11.
Marcus Rohrbach et al, "Transfer Learning in a Transductive setting", pp. 1-9.
Jiawei Wu et al, "Self-Supervised Dialogue Learning", dated Jun. 30, 2019, pp. 1-11.

* cited by examiner

ARTIFICIAL INTELLIGENCE SYSTEM USING UNSUPERVISED TRANSFER LEARNING FOR INTRA-CLUSTER ANALYSIS

BACKGROUND

In recent years, more and more raw data that can potentially be utilized for solving complex analytics problems is being collected from a large variety of sources, such as sensors of various kinds including medical equipment, store catalog entries, web server logs, social media services, financial transaction records, security cameras, and the like. A variety of analytics techniques, including machine learning, statistics, graph theory and the like can be combined to create algorithms that can solve problems in various domains such as natural language processing, financial fraud detection, terrorism threat level detection, human health diagnosis and the like.

Finding solutions to the problem of identifying duplicate entities in a large group of entities, or of identifying closely matching entities from such groups, is important for a variety of applications. For example, databases containing records from multiple sources may sometimes have to be merged, as when two business organizations combine into a single organization. A customer database from one of the organizations may store information about customers in a different format, or using a different schema, than the format or schema used by the other organization, and identifying and removing duplicate entries may be desirable. In another context, identifying duplicate items (or clusters of near-duplicate items) within large item catalogs may be helpful for organizing the catalogs, responding to search queries, and so on.

A number of algorithms have been developed in an attempt to address similarity-based clustering or deduplication of data records. Some algorithms may sometimes end up generating clusters which contain at least some highly dissimilar records, which is undesirable. Reliably generating clusters of closely-matched records from very large input data sets remains a challenging technical problem.

Figure 1:
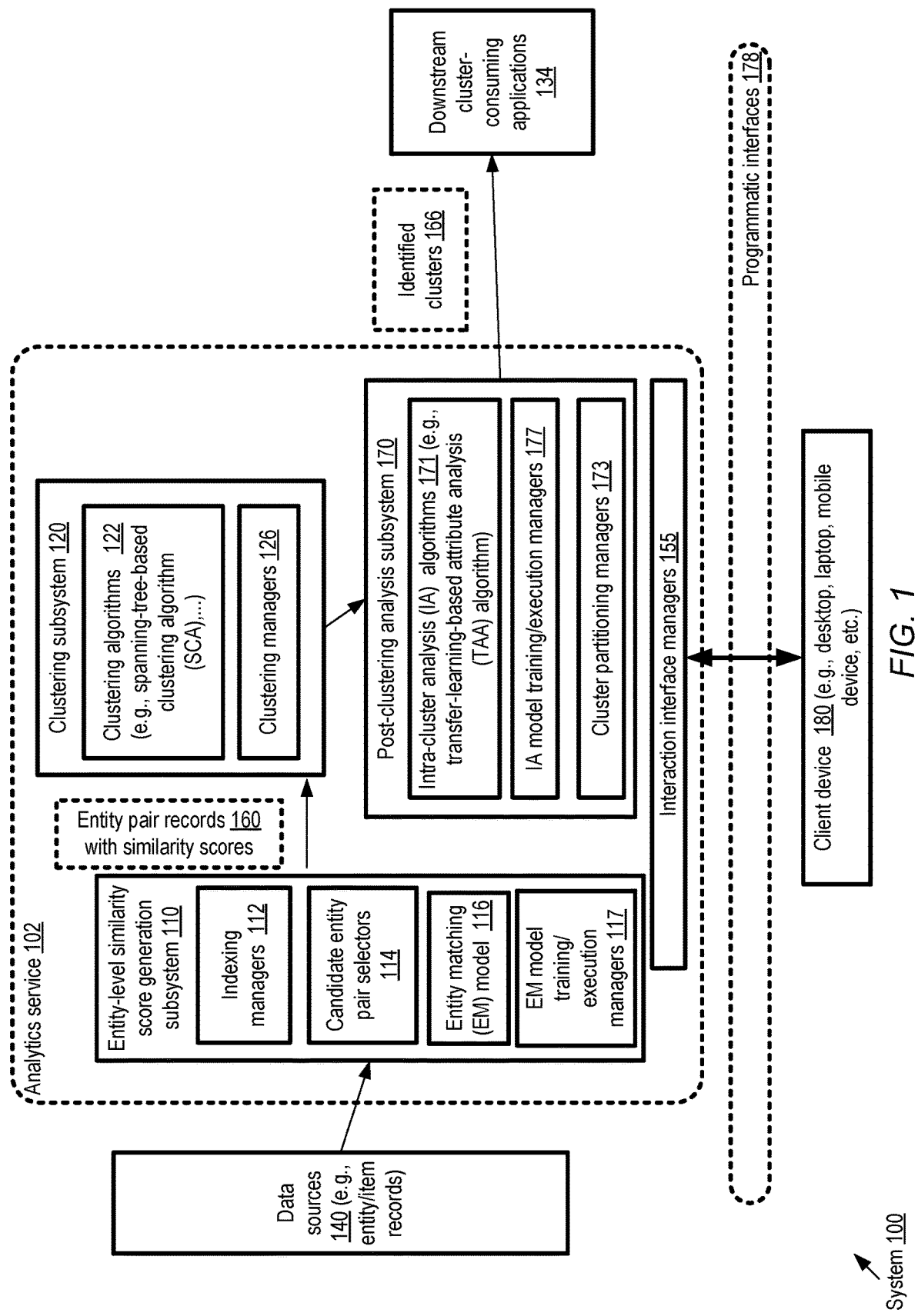
FIG. 1 illustrates an example system environment in which unsupervised transfer learning may be used to determine whether clusters identified from a set of entity records should be partitioned, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for automated attribute-level analysis of clusters of entity records via an unsupervised transfer learning methodology in which an entity-pair similarity detection model used for the initial identification of the clusters is re-used to automatically generate labels for curated training data sets of one or more attribute-value-pair similarity detection models. A labeled training data set may have to be obtained from annotators for the entity-pair similarity detection model, which may also be referred to as an entity matching machine learning model or an entity level model. With the help of entity-level similarity scores obtained from the trained entity matching model, an initial set of clusters may be generated from a collection of entity records using any of a variety of clustering algorithms in different embodiments. The objective of the initial clustering may comprise identifying records which correspond to the same real-world entity—e.g., in a store environment (e.g., an online or brick-and-mortar store) in which the represented entities correspond to respective items of a catalog, a given cluster should ideally comprise duplicate records which all represent the same item. However, for a number of reasons, it may sometimes be the case that an identified cluster happens to contain records which actually represent items which should not be considered duplicates or matches. In the store example, this may occur for example if two sellers sell respective electronics items which have similar technical specifications but are manufactured by companies with slightly different names, because of imperfections/imprecision in the entity matching model, and/or because of incomplete/missing attribute values. Clusters with these types of variations among their member records with respect to real-world entities may be said to exhibit intra-cluster divergence. Of course, it may sometimes be the case that minor misspellings or other types of mistakes/gaps in the attribute values may result in non-identical entity records which actually represent the same real-world entity, and the algorithms used for the initial clustering may be designed to detect such mistakes and place such entity records within the same cluster.

In order to detect erroneously-constructed or divergent clusters, and take corrective actions such as partitioning divergent clusters when needed, a deeper level of analysis referred to as post-clustering analysis or intra-cluster analysis may be performed in various embodiments. A set of critical or important attributes of the entity records, which are likely to be most useful to distinguish non-duplicated entity records within clusters, may be determined or identified in at least some embodiments. Then, a subset of the previously-generated clusters which meet an expected intra-cluster divergence criterion (e.g., clusters which are smaller than a threshold size, and thus may be less likely to contain mismatched entity records) may be selected as candidates for generating attribute-level training data sets for intra-cluster analysis. Such clusters, which may be termed training-data-set (TDS) clusters, may be chosen because one of the objectives of the intra-cluster analysis is to learn from examples in which, even though there may be differences in attribute values for critical attributes among entity record pairs, the underlying real-world entities represented by the entity records are the same.

From respective pairs of entity records of such candidate TDS clusters, corresponding attribute value pairs may be generated for the critical attributes. The similarity scores generated by the trained entity matching model for such attribute value pairs may then be used to automatically generate attribute-pair similarity scores or labels, without requiring any manual annotation; in effect, the learning already completed for the trained entity matching model may be re-used or transferred to generate the attribute-level labels. The labeled attribute-pair level data thus produced may then be used to train one or more attribute-pair similarity prediction models, e.g., using byte-pair encoding techniques and convolutional neural networks in some cases. In order to determine whether a given cluster is a candidate for potential partitioning or de-clustering, attribute value pairs extracted from the given cluster's entity records may be provided as input to the trained versions of the attribute-pair similarity detection models in various embodiments. If the similarity scores for at least some of the attribute value pairs of the given cluster are below a threshold, this may be used as at least one factor which triggers partitioning of the given cluster in at least some embodiments, leading to an improvement in the purity or quality of the clusters (i.e., fewer clusters which each comprise non-duplicate entities). The improved clusters may then be used in turn to provide better search results, to improve the organization of retail web sites, and/or for a variety of other purposes.

As one skilled in the art will appreciate in light of this disclosure, certain embodiments may be capable of achieving various advantages, including some or all of the following: (a) reducing the amount of computing, storage and other resources that have to be dedicated to labeling data sets for training machine learning models used to analyze clusters for potential partitioning, (b) improving the overall quality of clustering solutions for large-scale data sets, and/or (c) improving the user experience of clients of web sites (including store web sites) which provide end users accesses to large catalogs, e.g., by providing better results for searches and comparisons.

According to some embodiments, a system may comprise one or more computing devices. The computing devices may include instructions that upon execution on or across the one or more computing devices cause the one or more computing devices to train, using a labeled data set, a first machine learning model to generate similarity scores for pairs of entity records. Individual ones of the entity records may comprise respective values for a plurality of attributes including at least a first text attribute in various embodiments.

From a plurality of clusters of entity records, at least a first cluster may be selected by the computing devices as a source of training data for a second machine learning model, based at least in part on an expected intra-cluster divergence criterion in some embodiments. As mentioned above, such clusters may be termed training-data-source (TDS) clusters, in contrast with other clusters, whose contents may not be used as part of the training data for the second machine learning model, whose objective is to predict intra-cluster attribute-level correlations/similarities (as opposed to the entity-level similarity predictions of first machine learning model, which has already been trained at this stage). The entity records of individual ones of all of the clusters may each satisfy an intra-cluster entity-level similarity criterion; for example, the clusters may have been generated based at least partly on entity-level similarity scores obtained from the first machine learning model or other similar entity matching models. The training-data-source cluster(s) may be selected from the overall collection of clusters based on a variety of factors and/or heuristics in different embodiments, such that the probability of finding entity records which represent multiple real-world items/entities within a given training-data-source cluster is expected to be low. For example in some embodiments the populations of individual clusters may vary widely, and smaller clusters may generally be less likely to contain divergent records (records representing different real-world entities) than larger clusters, so clusters smaller than a threshold size (e.g., 100 entity records) may be selected as candidates for providing training data.

From one or more of the training-data-source clusters including the first training-data-source cluster, a collection of entity record pairs and a corresponding collection of attribute value pairs may be generated in at least some embodiments. An individual attribute value pair corresponding to a particular entity record pair may comprise, for example, (a) a value of the first text attribute from a first entity record of the particular entity record pair and (b) a value of the first text attribute from the second entity record of the particular entity record pair. Then, based at least in part a respective similarity score obtained from a trained version of the first machine learning model for one or more entity record pairs of the collection of entity record pairs, a respective attribute similarity score for individual ones of the attribute value pairs may be generated. In effect, the insights gained into entity-level similarity by the first machine learning model may be used to automatically generate attribute-level similarity metrics in such embodiments. Without using labelers or annotators, a label may be assigned to each of the attribute value pairs using the generated attribute value pair similarity scores.

The automatically-labeled attribute pair data set may be used to train the second machine learning model in various embodiments to generate attribute similarity scores corresponding to pairs of values of attributes (such as the first text attribute) of entity records in at least some embodiments. A trained version of the second machine learning model may be stored in various embodiments. In some embodiments, several such attribute-level similarity detection models may be trained, e.g., one for each of a set of critical or important attributes of the entity records. The trained versions of such models may then be used to analyze various clusters to determine whether any action (such as automated partitioning or auditing for possible partitioning) should be performed on the clusters. For example, if some pairs of entity records within a given large cluster have attribute values for which the second machine learning model predicts similarity scores lower than a threshold, the large cluster may be partitioned into some number of sub-clusters, or be sent to an auditing team to determine whether such partitioning is advisable.

The particular attributes for which the attribute-level machine learning models are trained using automatically labeled data sets may be identified via any of a variety of techniques in different embodiments. In some embodiments, the clustering analysis may be performed at an analytics service, e.g., at a provider network or cloud computing environment, and a client of the service on whose behalf the clusters are being analyzed may provide a list of critical attributes for which the models should be trained. In other embodiments, such an analytics service may infer such critical attributes automatically, e.g., based on analysis of knowledge bases which indicate reasons why clusters have been partitioned in the past, or based on detected changes to the set of attributes of the entity records over time. In at least one embodiment, an analytics service may deduce one or more candidate important attributes, and obtain approval from the client regarding the deduced attributes before generating the training data and models corresponding to the important attributes. In at least one embodiment, a client of an analytics service may indicate the criteria to be used to select the training-data-source clusters from a larger pool of clusters. In other embodiments, the analytics service may automatically determine the potential divergence criteria or cluster-level properties (such as cluster size) to be used to select the training-data-source clusters, e.g., with the help of a knowledge base which comprises records of earlier scenarios in which clusters were identified as divergent. The data types of the attributes used as inputs for the attribute-level model may include text, images, videos, audios and/or multi-modal data types in different embodiments; as such, the intra-cluster analysis techniques described herein are not limited to text attributes.

Any of a variety of machine learning algorithms and architectures may be employed for the attribute-level models used for intra-cluster analysis in different embodiments. In at least one embodiment, a symmetric neural network model may be trained, e.g., with a pair of subnetworks with shared parameters, and with each subnetwork comprising one or more convolution layers. In other embodiments, attribute-level models which do not employ neural networks may be trained. In at least one embodiment, byte-pair encodings which produce character-level embeddings of text attributes may be used in the attribute-level models.

Any of a number of different techniques may be used to obtain the attribute value pair labels in different embodiments. In some embodiments, aggregate values (e.g., mean values) of the entity pair similarity scores or labels generated by the trained entity matching model may be used as labels for attribute value pairs, without taking other factors into account. In other embodiments, content comparison functions (e.g., string similarity detection functions) may be used together with the entity pair labels to generate the attribute value pair labels.

In some embodiments, as mentioned above, the intra-cluster analysis techniques using transfer learning and data-driven selection of training-data-source clusters may be implemented at one or an analytics service of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which unsupervised transfer learning may be used to determine whether clusters identified from a set of entity records should be partitioned, according to at least some embodiments. As shown, system 100 includes resources and artifacts of an analytics service 102, which comprises at least three subsystems: an entity-level similarity score generation subsystem 110, a clustering subsystem 120 and a post-clustering analysis subsystem 170. The analytics service 102 may be implemented at a provider network or cloud computing environment in some embodiments. The service 102 may implement a set of programmatic interfaces 178 in the depicted embodiment, such as web-based consoles, APIs, graphical user interfaces, command line tools and the like, which may be utilized by various clients to submit requests related to clustering and other types of analysis from client devices 180 (e.g., desktops, laptops, mobile computing devices, etc.) and receive corresponding responses. In some embodiments the analytics service 102 may comprise a collection of interaction interface managers 155 implemented at one or more computing devices, which may receive or obtain the submitted client requests and re-direct the requests (or send internal versions of the requests) to the appropriate subsystem. System 100 may be referred to as an artificial intelligence system in various embodiments.

In at least some embodiments, a client of the analytics service 102 may provide an indication of a data source 140 from which raw data records pertaining to a set of entities for which clustering is to be performed may be obtained or accessed. For example, such raw data records may comprise names, identifiers and other attribute values for entities such as customers of an organization, patients and practitioners of a health care system, items of a store catalog, and so on, depending on the specific problem domain to be addressed via clustering. The attributes of a given entity record may comprise any of a variety of data types in different embodiments, such as text, image, video, audio, and/or other data types. The raw data may first be processed at the entity-level similarity score generation subsystem 110, where a workflow involving a number of subcomponents may be employed to generate pairwise similarity scores for at least a subset of the entities represented in the raw data. One or more indexing managers 112 may use the attribute information contained in the raw input to generate indexes on the entities in some embodiments, which can then be used to conduct a preliminary search for entities likely to be similar to any given entity. Using the indexes, a set of candidate entity pairs for which it appears reasonable to compute similarity scores may be identified for the entities of the raw data set by one or more candidate entity pair selectors 114. For example, in one implementation, from a raw data set comprising information about properties or attributes of 10,000,000 entities E1 through E10000000, for a given entity E1, a set of 200 candidate pairs comprising pairs (E1, E2), (E1, E234), (E1, E577), (E1, E3412917), . . . , and so on may be identified. Labels for at least a subset of the candidate entity pairs may be obtained in various embodiments, e.g., from human annotators and/or automated annotators. Then, in at least some embodiments, one or more entity matching (EM) machine learning models 116 may be trained using the labeled entity pairs and executed to generate pairwise similarity scores for the candidate entity pairs, e.g., by EM model training/execution managers 117 implemented at one or more computing devices. In at least some embodiments, records indicating the entity pairs and their respective computed similarity scores may be stored at a persistent data repository of the analytics service 102. A set of entity pair records 160, which includes similarity scores for various pairs of entities identified in a given raw data set, may be provided as input by the clustering subsystem 120 in the depicted embodiment. In some embodiments, instead of using the analytics service to generate the similarity scores, a client may generate the entity pair records 160 using other resources for at least some raw data sets, and provide (or indicate the location of) the entity pair records with the similarity scores as input via programmatic interfaces 178.

At the clustering subsystem 120, any of a variety of clustering algorithms 122 may be applied by one or more clustering managers 126 to the input entity pair records 160, e.g., in response to programmatic requests from clients submitted via programmatic interfaces 178. In one embodiment, a client may specify the particular clustering algorithm to be used for a given input data set comprising entity pair records 160, while in other embodiments clients may simply request clustering of the data, and the analytics service 102 may select the specific algorithm to be used. In the depicted embodiment, the set of clustering algorithms 122 supported at the clustering subsystem 120 may include an efficient spanning-tree-based clustering algorithm (SCA). In a pre-compute phase of the SCA, input entity pair records may be analyzed iteratively, with each iteration corresponding to a particular similarity threshold selected from a range of similarity thresholds, to produce at least a hierarchical cluster representation (HCR) and an accumulated spanning tree representation (ASTR) of the input data. Within a given iteration, in at least some embodiments respective sets of computations may be performed to generate clusters from a filtered entity pair collection identified for the iteration, to generate spanning trees from the clusters, to compute representative nodes identified based on centrality measures from the spanning trees, and then to generate the input entity pairs for the next iteration using an inter-cluster edge reduction/aggregation technique. The HCR may include information about representative nodes identified for various clusters generated at different intra-cluster similarity levels as the iterations proceed, which can then be used in the run-time clustering phase to respond to client requests for clusters with numerous different intra-cluster similarity levels without having to re-process the input entity pairs 160 for each different intra-cluster similarity level. The ASTR may include spanning trees identified for the various clusters represented in the HCR, and may typically eliminate numerous edges from the graphs corresponding to the input entity pairs as a whole, which makes the input entity pairs 160 easier to process and visualize. The HCR and/or the ASTR, which grow as more analysis iterations are performed, may be stored in persistent storage in some embodiments. The HCR and the ASTR may be used to respond to a variety of clustering requests, e.g., for clusters with different thresholds of intra-cluster similarity.

In various embodiments, for at least some of the clusters identified in subsystem 120 for a given collection of entity records from a data source, post-clustering analysis may be performed with the help of subsystem 170. Such post-clustering analysis may be motivated, for example, because auditing of the clusters identified with the help of the entity-level similarity scores may reveal that some clusters contain entity records corresponding to different real-world entities or items, even though each of the clusters satisfies an intra-cluster entity-level similarity criterion. Such clusters, which contain records representing different real-world entities, may be referred to as "impure" or "divergent" clusters. Ideally, all the clusters identified by subsystem 120 may be expected to be "pure", with all the entities represented in a given cluster corresponding to the same entity or near-identical entities. Post-clustering analysis may be performed at the attribute level for a set of important or critical attributes of the represented entities to help improve the overall purity of the clusters identified at subsystem 120 in the depicted embodiment.

The post-clustering analysis subsystem 170 may include intra-cluster analysis (IA) model training/execution managers 177, implemented at one or more computing devices in the depicted embodiment. Any of a variety of IA algorithms 171 may be utilized for post-clustering analysis in different embodiments. In the embodiment depicted in FIG. 1, one or more machine learning models implementing at least a transfer-learning based attribute analysis (TAA) algorithm may be used.

Results obtained from an EM model 116 (which has already been trained) in various embodiments may be used to generate labels for attribute value pairs used in the TAA in various embodiments, in effect transferring learning from the EM model. One or more important or critical attributes to be used for the intra-cluster analysis may be determined in various embodiments at the subsystem 170, e.g., based on client-provided programmatic input and/or based on automated analysis. The critical attributes may comprise text, image, audio, video and/or other types of content in various embodiments. In some embodiments, from a collection of clusters generated from a given entity record collection by the clustering subsystem 120, one or more training-data-source (TDS) clusters (clusters from which pairs of extracted attribute values are to be used to train an attribute-level similarity prediction model) may be identified, e.g. by IA model training/execution managers 177. The TDS clusters may be selected from the larger collection of clusters because they meet an expected intra-cluster divergence criterion in at least one embodiment. For example, in one implementation clusters with a size less than a threshold (for example 50 or 100 records) may be selected as TDS clusters, while larger clusters may be rejected as sources of training data for the attribute-level model. In another implementation, a cluster which contains some number of pairs of entity records with particular critical attribute value pairs may be selected as TDS clusters. For example, it may be the case that distinguishing among entity records with "attribute1" values in the set V={value1, value2, value3, value4} may be important for a particular client of the analytics service. If there are numerous pairs of entities (Ei, Ej) in a given cluster C1 such that Ei.attribute1∈V and Ej.attribute∈V, C1 may be selected as a TDS cluster, while if there are no such attribute value pairs in a different cluster C2, C2 may not be selected.

From the TDS cluster(s), a collection of entity record pairs and a corresponding collection of attribute value pairs may be identified in the TAA algorithm in the depicted embodiment. An individual attribute value pair corresponding to a particular entity record pair may comprise (a) a value of a particular critical attribute from a first entity record of the particular entity record pair and (b) a value of the same attribute from the second entity record of the particular entity record pair. Based at least in part a respective similarity score obtained from a trained EM model 116 for one or more entity record pairs of the collection of entity record pairs, a respective attribute similarity score for individual ones of the attribute value pairs may be inferred or computed in various embodiments. For example, if there are 10 entity record pairs in the collection with the same pair of attribute values (CAttr1.value1 and Cattr1.value2) for a given critical attribute Cattr1, in one implementation the attribute-level similarity score may be computed as the mean of the 10 entity-level similarity scores for the 10 entity pairs. Without utilizing a labeler or annotator, a label based at least partly on the attribute similarity score may be assigned to the attribute value pairs. In some implementations, the attribute-level similarity score may itself be used as the label; in other embodiments, the attribute-level similarity score may be transformed (e.g., into a 0 or 1) or normalized to obtain the label. Each of the attribute values of the attribute value pairs for which labels are generated may be required to belong to entity records of the same TDS cluster in at least one embodiment—that is, only intra-cluster attribute value pairs may be labeled in such embodiments, even if multiple TDS clusters are identified. This restriction may be enforced in such embodiments because the objective of the post-clustering subsystem 170 is to analyze contents of one cluster at a time, e.g., to determine whether the cluster may need to be partitioned, so generating training data which spans clusters may not be as effective. In other embodiments, such restrictions may not be enforced—instead, one or more labeled attribute value pairs may be generated using entity records which belong to distinct TDS clusters. By transferring knowledge from the trained EM model to automatically generate the attribute value pair labels, considerable savings may be achieved in time, resources used, and expense in various embodiments.

Using the labeled attribute value pairs, a machine learning model which can generate similarity scores for attribute value pairs may be trained by IA model training/execution managers 177 in the depicted embodiment. Any of a variety of machine learning models may be trained, including but not limited to symmetric neural network based models of the kind discussed in further detail below. Using the trained attribute-level model, one or more clusters generated at the clustering subsystem 120 may be analyzed. If the analysis reveals that a given cluster contains one or more pairs of entity records whose attribute-level similarity scores (for at least one of the critical/important attributes) is below a threshold, such a cluster may be subdivided into two or more smaller clusters in some embodiments, e.g., by cluster partitioning managers 173 implemented at one or more computing devices. For example, a cluster which contains attribute values "ValueA" and "ValueB" for a critical attribute, such that the predicted attribute similarity score SS("ValueA", "ValueB") is less a threshold S1 may be split into two clusters, one cluster which only contains "ValueA" and one cluster which only contains "ValueB". Of course, it may be the case that many of the clusters identified by subsystem 120 do not need to be subdivided or partitioned in various embodiments.

Clusters identified using subsystems 120 and 170 may be used to respond to specific clustering requests submitted from client devices 180, and/or to provide identified clusters 166 to one or more downstream cluster-consuming applications 134. In a store problem domain, for example, the downstream applications 134 may comprise one or more of (a) a search application of a store web site, (b) a catalog analysis or catalog management application, or (c) a comment analysis application (which may be employed for example to compare customer comments regarding similar items, and hence obtain a better understanding of the customer views of similar items). The cluster-consuming applications 134 may in turn take automated actions based on the provided identified clusters 166 in various embodiments (for example, search indexes may be modified to provide improved search results, catalogs may be reorganized to capture similar items within categories and sub-categories, and so on).

In at least some embodiments, various computations of the subsystems 110, 120 and/or 170 may be implemented at multiple servers or resources in parallel, thus enabling scaling of the clustering methodology as the input data set size increases. In some embodiments, a combination of sequential and parallel processing approaches may be used: e.g., for some computations, a parallel processing server fleet may be employed, while for other computations, a single server may suffice.

Clients of the analytics service may indicate various preferences with respect for clustering-related tasks to be performed on their behalf in the depicted embodiment via the programmatic interfaces 178. For example, a client may submit a programmatic request to perform post-clustering analysis for a particular group of clusters identified from a specified data set, and this may trigger the automated generation of the labeled attribute value pairs using transfer learning, as well as the training of attribute-level similarity detection model. Upon request, clients may be provided visualizations of at least parts of results generated at the different subsystems 110, 120 or 170. Clients may obtain various types of metrics pertaining to the identified clusters (including the original clusters identified at subsystem 120, as well as the partitioned clusters generated in post-clustering analysis in different embodiments via the programmatic interfaces 178.

Overview of Cluster Creation and Analysis

Figure 2:
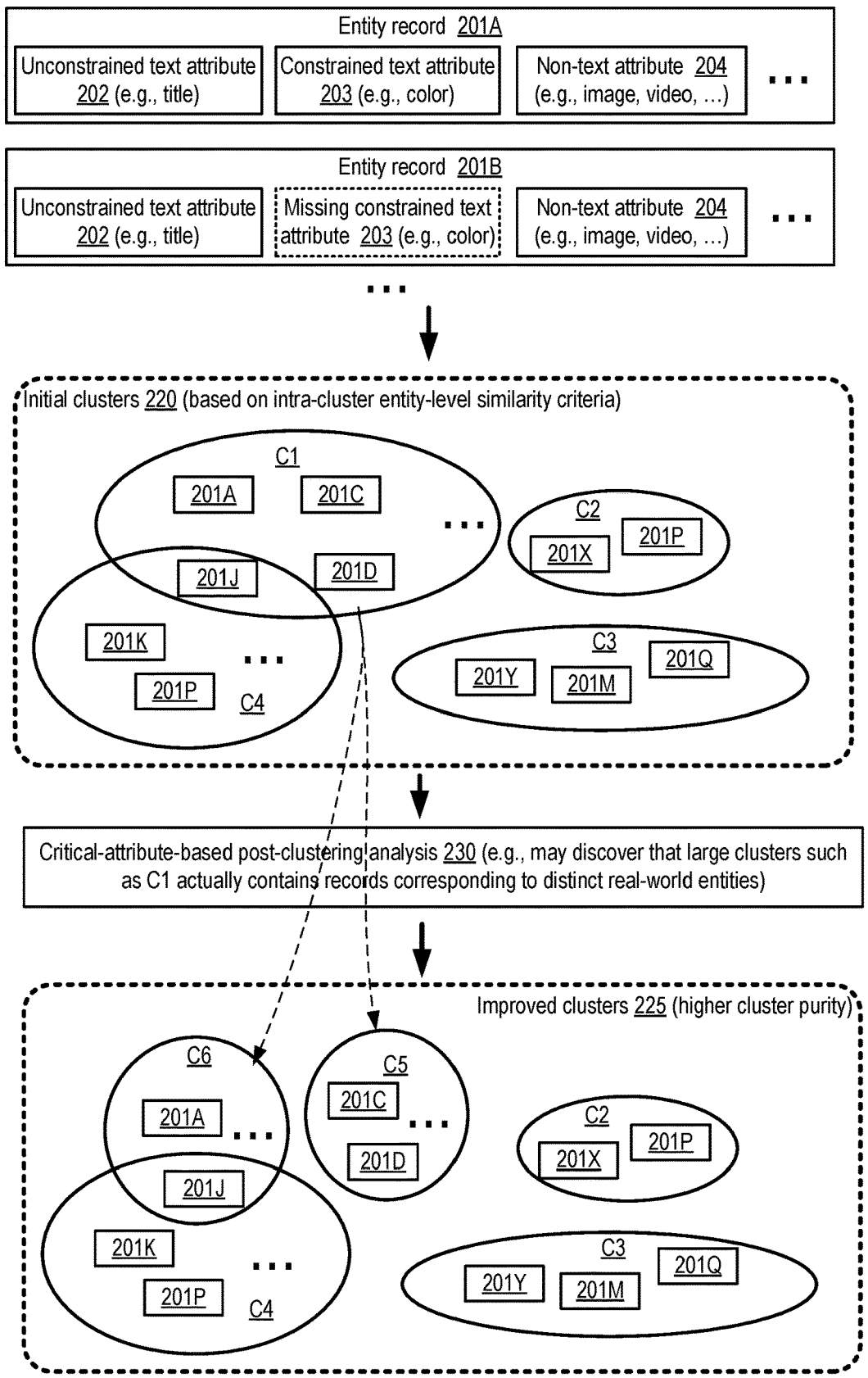
FIG. 2 illustrates an overview of a technique for attribute-level post-clustering analysis, according to at least some embodiments.

FIG. 2 illustrates an overview of a technique for attribute-level post-clustering analysis, according to at least some embodiments. In the depicted embodiment, a data set comprising a plurality of entity records 201, such as 201A and 201B, may be indicates as input for clustering. A given entity record may comprise values of numerous attributes, such as one or more unconstrained text attributes 202, one or more constrained text attributes 203, one or more non-text attributes 204 (comprising images, video, audio, etc.), and so on. An unconstrained text attribute such as 202 may comprise arbitrary text, e.g., comprising an arbitrary number of words or tokens expressed in any desired language in the depicted embodiment. A constrained text attribute may only be permitted to take on values from a specified set of values, such as a list of colors ("red", "blue", "green" etc.). Values for some attributes may be missing from some entity records in the depicted example scenario—for example, a value for constrained text attribute 203 is not present on entity record 201B.

Initial clusters 220 may be identified from the data set using the kinds of entity-level techniques described above with respect to subsystems 110 and 120 of FIG. 1 in the depicted embodiment, e.g., including the training and execution of a similarity score generating machine learning model for pairs of entities. Initial clusters 220 may include cluster C1 (comprising entity records 201A, 201C, 201J and 201D), cluster C2 (comprising entity records 201X and 201P), cluster C3 (comprising entity records 201Y, 201M and 201Q), and cluster C4 (comprising entity records 201J, 201K and 201P). Some clusters may overlap with others—e.g., entity record 201J belongs to cluster C1 and cluster C4 in the depicted example.

After the initial clusters 220 have been identified, critical-attribute-based post-clustering analysis 230 may be performed in the depicted embodiment. A set of important or critical attributes (e.g., attribute 202) may be identified for the initial clusters, a training data set comprising attribute-value pairs may be automatically generated as described above, and a second machine learning model which generates attribute value pair similarity scores (as opposed to entity pair similarity scores) may be trained. Attribute values obtained from a given cluster (such as C1) of initial clusters 220 may be provided as inputs to a trained version of the second machine learning model. The output attribute-level similarity scores generated the second machine learning model may in some cases indicate that the given cluster actually contains entity records that (ideally) should not be placed together in the same cluster. As a result, some clusters may be subdivided into smaller clusters, and an improved set of clusters 225 with a higher purity level may be obtained. In the depicted example scenario, cluster C1 may be partitioned into clusters C5 and C6, for example, based on differences in attribute-level similarity scores between record sets {201A, 201J} and {201C and 201D}.

Method for Analysis of Identified Clusters

Figure 3:
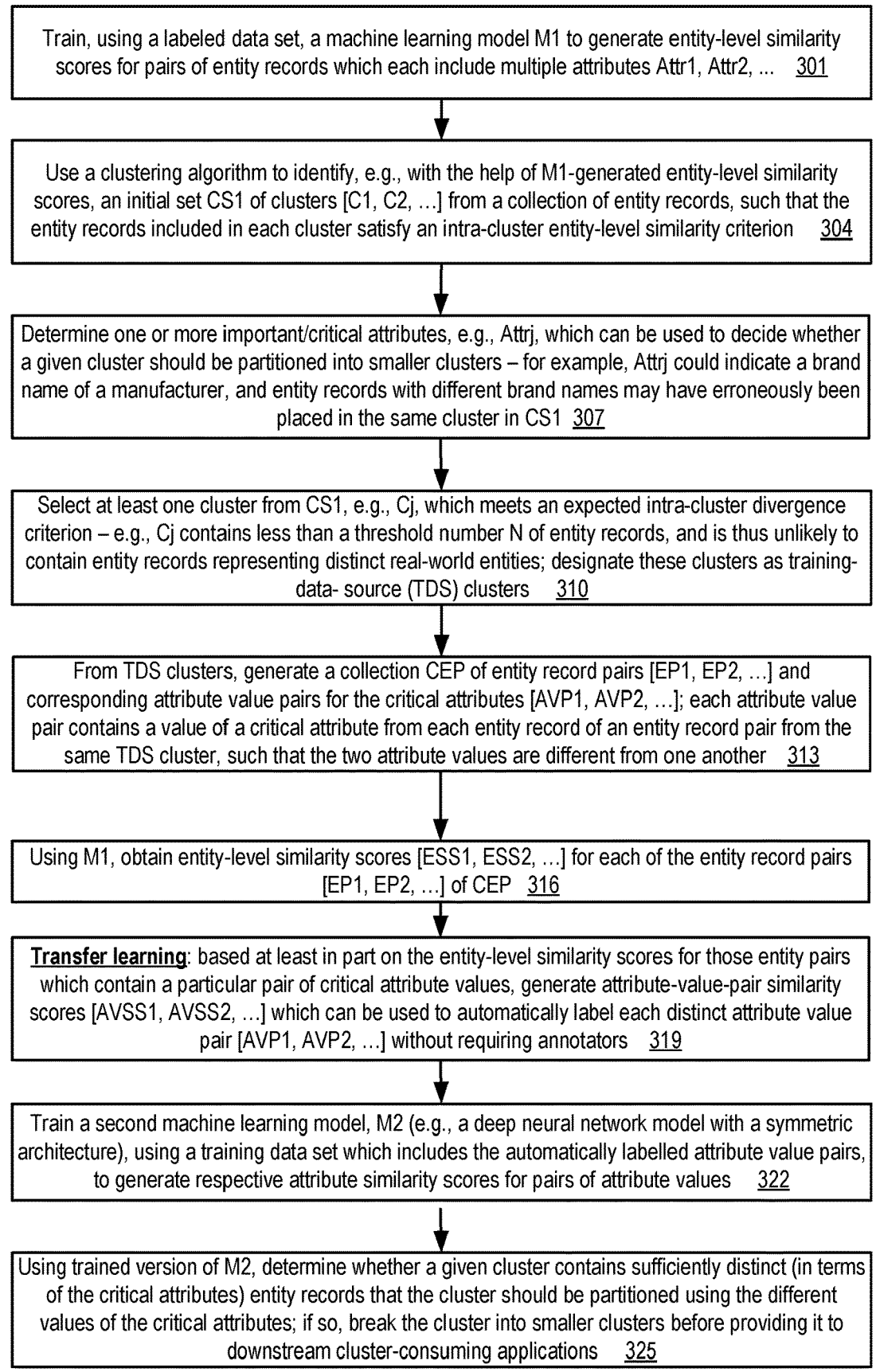
FIG. 3 is a flow diagram illustrating aspects of operations that may be performed to analyze clusters based on critical attribute analysis using transfer learning, according to at least some embodiments.

FIG. 3 is a flow diagram illustrating aspects of operations that may be performed to analyze clusters based on critical attribute analysis using transfer learning, according to at least some embodiments. As shown in element 301, a machine learning model M1 may be trained, using a labeled data set, to generate entity-level similarity scores for pairs of entity records which each include values for multiple attributes Attr1, Attr2, and so on. The labels for the training data used for ML1 may be obtained from one or more human and/or automated annotators. Each entity record represents a corresponding real-world entity, such as an item included in a catalog of an organization.

A clustering algorithm may be used to identify an initial set CS1 of clusters [C1, C2, . . . ] from a collection of entity records, such that the entity records in each cluster satisfy an intra-cluster entity level similarity criterion (element 304). In at least some embodiments, the objectives of the clustering may comprise identifying (and grouping within respective clusters) duplicate or near-duplicate entity records—that is, records that represent the same real-world entity or nearly-identical real-world entities. The clustering algorithm may utilize entity-level similarity scores generated for various pairs of the entity records of the collection by a trained version of M1 in various embodiments. Any of a variety of clustering algorithms may be employed in different embodiments, such as the spanning tree based clustering algorithm discussed in the context of FIG. 1, a connected components algorithm, and so on. In some embodiments in which the clustering algorithm is run at an analytics service similar to service 102 of FIG. 1 on behalf of a client, the client may provide a trained version of M1 from which pairwise entity-level similarity scores can be generated for the clustering algorithm; as such, M1 may not have to be trained at the analytics service.

One or more important/critical attributes of the entity records (such as an attribute Attrj) may be determined (element 307) in at least some embodiments, which can be used to perform intra-cluster analysis to determine whether a given cluster of CS1 should be partitioned into smaller clusters. For example, in a store context, Attrj could include a brand name of a manufacturer of one or more of the items represented by the entity records, and a given cluster should ideally not contain entity records corresponding to different manufacturers. In some embodiments, such critical attributes may be indicated programmatically by a client on whose behalf the clustering is performed at an analytics service. In at least one embodiment, such an analytics service may be able to automatically deduce the critical attributes, e.g., based on analysis of a knowledge base which indicates reasons why clusters had to be partitioned in the past, based on analysis of changes in the set of attributes included in the entity records for a given application over time, and so on.

One or more clusters of CS1 which meet an expected intra-cluster divergence criterion may be selected in the depicted embodiment as potential sources of training data for a second machine learning model (element 310). For example, a cluster Cj which contains less than a threshold number N of entity records, and is thus expected to have a low probability of containing entity records representing distinct real-world entities, may be selected and designated as a training data source (TDS) cluster. Multiple clusters which satisfy the divergence criteria may be selected as TDS clusters in some embodiments— e.g., out of 100 clusters in CS1, 70 may satisfy the criteria and be selected, while the remaining 30 may not be selected as TDS clusters. In some embodiments, a number of different criteria may be used to identify TDS clusters—e.g., in addition to or instead of size alone, a measure of the extent of the divergence/variation of values of the critical attributes within a given cluster may be used to select TDS clusters.

From the TDS cluster or clusters, a collection of entity record pairs [EP1, EP2, . . . ] and corresponding attribute value pairs for one or more critical attributes [AVP1, AVP2, . . . ] may be generated in the depicted embodiment (element 313). Each attribute value pair may contain a value of a critical attribute from each entity record of an entity record pair from the same TDS cluster in at least some embodiments, such that the attribute values of the attribute value pair differ from one another. Consider a scenario in which one TDS cluster TDSC1 contains the entity records E1, E2 and E3, with the values "ABC", "ABD" and "ABE" for a critical attribute CAttr1 respectively, while a second TDS cluster TDSC2 contains entity records E4 and E5 with values "ABF" and "ABZ" for attribute Cattr1. In this example, the attribute value pairs generated may include ("ABC", "ABD"), ("ABC", ABE"), ("ABD, ABE"), and ("ABF", "ABZ") in one embodiment, because each of the attribute values of these pairs are from within the same TDS cluster. However, attribute value pairs whose attribute values would have to be obtained from different clusters, such as ("ABC", "ABF") or ("ABD, "ABZ") would not be generated in such an embodiment. A different approach may be taken in another embodiment, in which cross-TDS-cluster attribute value pairs may also be generated.

In various embodiments, entity-level similarity scores [ESS1, ESS2, . . . ] may be obtained for the entity pairs [EP1, EP2, . . . ] of CEP using the trained version of M1 (element 316). Based at least in part on the entity-level similarity scores for those entity pairs which contain a particular pair of attribute values, attribute-value-pair similarity scores [AVSS1, AVSS2, . . . ] may be generated in various embodiments (element 319). These attribute-value-pair similarity scores may then be used to automatically label the attribute value pairs [AVP1, AVP2, . . . ], without requiring annotators or labelers. As such, information learned earlier (by M1) about factors contributing to similarity between entity records may be transferred for attribute-level analysis, thus representing an example of transfer learning. Note that in some embodiments, factors other than the entity-level similarity scores may also be used to generate the attribute value pair labels. In one implementation, for example, in which a critical attribute is a text attribute, text similarity metrics such as cosine similarity, Jaccard similarity or the like may be computed and used together with the entity-level similarity metrics to arrive at the attribute value similarity scores.

A second machine learning model M2 may be trained, using a training data set which comprises at least some of the automatically labeled attribute value pairs, to generate respective attribute similarity scores for pairs of attribute values (element 322) in the depicted embodiment. In at least some embodiments, M2 may comprise a deep neural network model with symmetric sub-networks and some number of convolution layers. Using attribute level similarity scored obtained from the trained version of M2, a determination may be made as to whether any given cluster contains sufficiently distinct (in terms of the critical attributes) entity records that the cluster should be partitioned into smaller clusters based on the different values of critical attributes (element 325). If clusters meeting such criteria are identified, they may be automatically subdivided into smaller clusters in at least some embodiments, before being provided to downstream cluster-consuming applications and/or to clients of an analytics service. Note that in at least some embodiments in which multiple critical attributes are identified, a respective attribute-level model may be trained using automatically-labeled training data for each of the critical attributes, and results obtained from any combination of one or more of such models may be used to make cluster partitioning decisions.

It is noted that in various embodiments, some of the operations shown in FIG. 3 may be implemented in a different order than that shown in the figure, or may be performed in parallel rather than sequentially. Additionally, some of the operations shown in FIG. 3 may not be required in one or more implementations.

Example Techniques for Automated Labeling of Attribute Value Pairs

Figure 4:
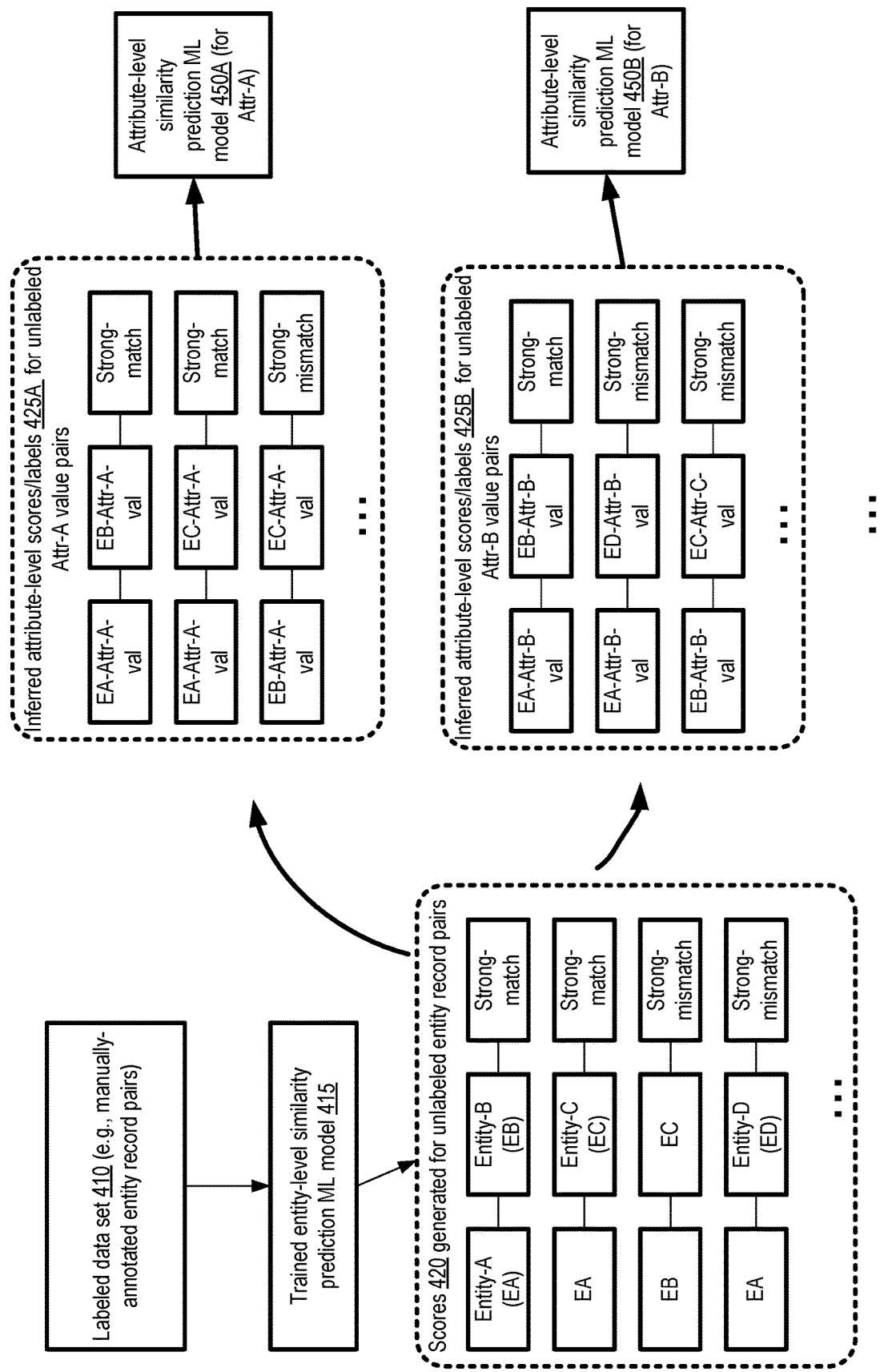
FIG. 4 illustrates an example technique in which entity pair level similarity information may be used to auto-generate labels for attribute value pairs, according to at least some embodiments.

FIG. 4 illustrates an example technique in which entity pair level similarity information may be used to auto-generate labels for attribute value pairs, according to at least some embodiments. A labeled data set 410, comprising for example numerous manually-annotated or manually-labeled pairs of multi-attribute entity records, may be used to train an entity-level similarity prediction ML model 415 in the depicted embodiment. For various pairs of entities which were not part of the labeled data set 410, a set of similarity scores 420 may be generated using the trained model 415. In some embodiments, for example, the scores generated may be real numbers in the range 0 to 1, with scores closer to 1 indicating stronger matches between the entities, and scores closer to 0 indicating strong mismatches. In the example scenario shown in FIG. 4, Entity A (EA) has a strong match with respect to Entity B (EB) and a strong match with Entity C (EC), but a strong mismatch with Entity D (ED). EB has a strong mismatch with EC. Each of the entity records EA, EB, EC and ED is assumed to contain values for at least two critical attributes Attr-A and Attr-B.

Using at least the corresponding entity-level similarity scores 420, attribute-level similarity scores 425A (for Attr-A) and 425B (for Attr-B) may be automatically inferred/generated and used for pairwise attribute-level labels in the depicted embodiment. Thus, a strong match score is automatically generated for the attribute value pair (EA-Attr-A-val, EB-Attr-A-val), where the notation EA-Attr-A-val represents EA's Attr-A value, and EB-Attr-A-val represents is EB's Attr-A value. Along similar lines, a strong match score is automatically generated for the attribute value pair (EA-Attr-A-val, EC-Attr-A-val) and (EA-Attr-B-val, EB-Attr-B-val), while strong mismatch scores are automatically computed for the attribute value pairs (EB-Attr-A-val, EC-Attr-A-val), (EA-Attr-B-val, ED-Attr-B-val) and (EB-Attr-B-val, EC-Attr-B-val). The inferred scores/labels 425A may then use used to train an attribute-level similarity prediction ML model 450A for critical attribute Attr-A, and a different attribute-level similarity prediction ML model 450B for critical attribute Attr-B in the depicted embodiment.

Figure 5:
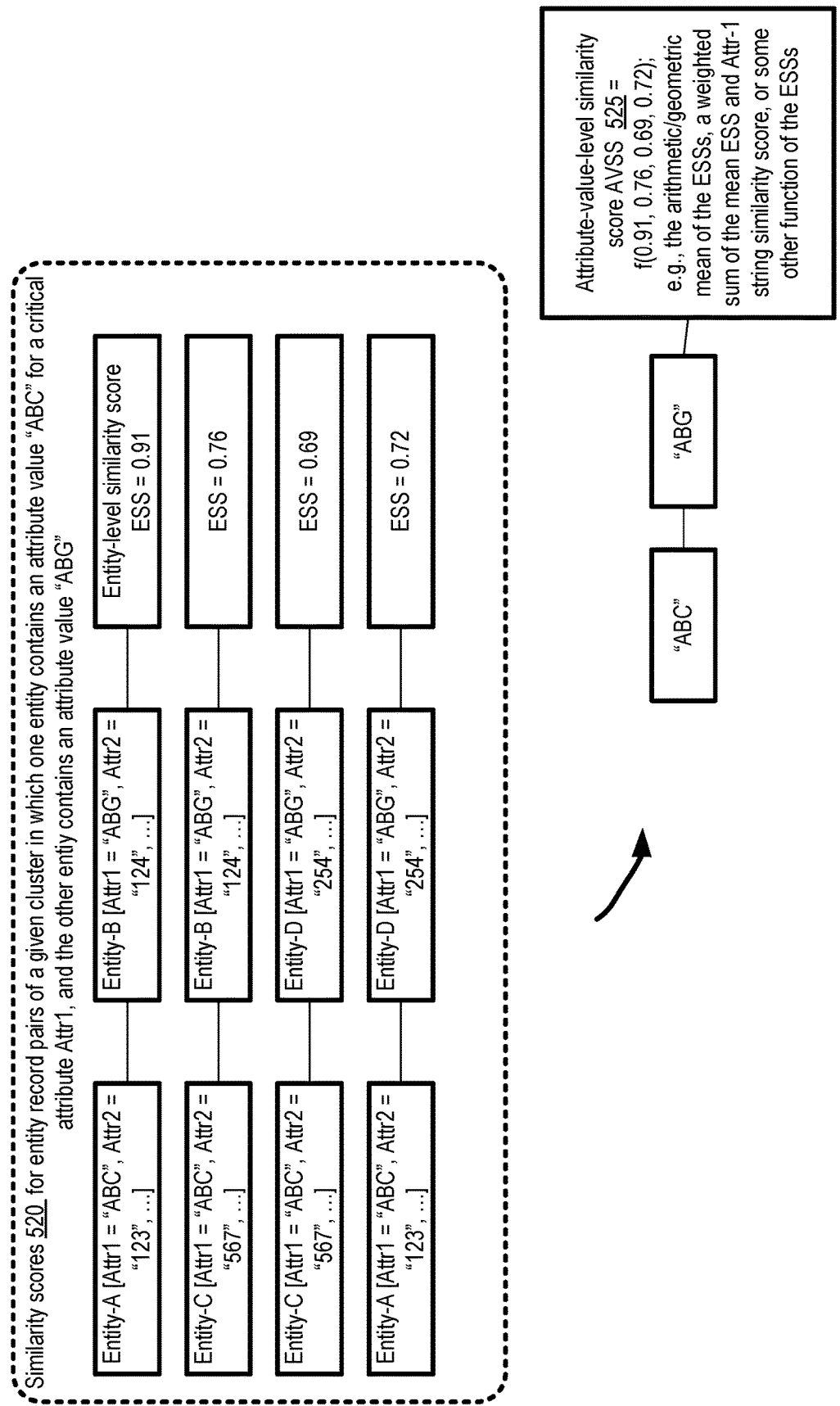
FIG. 5 illustrates an example scenario in which entity-level similarity scores pertaining to a plurality of entity pairs of a cluster may be aggregated to estimate attribute-level similarity information, according to at least some embodiments.

FIG. 5 illustrates an example scenario in which entity-level similarity scores pertaining to a plurality of entity pairs of a cluster may be aggregated to estimate attribute-level similarity information, according to at least some embodiments. A given training-data-source cluster, selected using expected divergence criteria as discussed earlier from a larger pool of clusters, may sometimes contain several different entity records which each contain the same value of a given critical attribute, but differ from one another in values of other attributes. As a result, the same attribute value pair may be extracted from several different entity record pairs with respective entity-level similarity scores in such cases. An example of such a scenario is shown in FIG. 5.

Four entity record pairs (Entity-A, Entity-B), (Entity-C, Entity-B), (Entity-C, Entity-D), and (Entity-A, Entity-D) are shown. All the entities from which these pairs are constructed (Entity-A, Entity-B, Entity-C and Entity-D) belong to a given TDS cluster. In the first entity record of each of the four pairs, the value of a critical attribute Attr-A is "ABC", and in the second entity record of each pair, the value of the critical attribute Attr-A is "ABG". The entity-level similarity scores (ESSs) 520 of each of the pairs, obtained for example using a pre-trained entity matching (EM) model as discussed earlier, are 0.91, 0.76, 0.69 and 0.72 respectively. When generating the ESSs, the EM may take several different attributes (including Attr2, and not just the critical attribute Attr1) of the entity records into account, which explains why the ESSs for the four pairs differ.

In the procedure of automatically generating an attribute-value similarity score (AVSS) 525 for the Attr-A value pair ("ABC", "ABG"), all four of the ESSs may be taken into account in various embodiments. A function f( ) whose inputs are based at least in part on the individual ESS values 0.91, 0.76, 0.69 and 0.72 may be used to compute the AVSS in the depicted embodiment. The function f( ) may vary in different implementations, e.g., based on the data type of the critical attribute for which the AVSS is being computed. In one simple implementation, f( ) may simply compute the arithmetic mean of the ESSs. In another implementation, the geometric mean may be computed. In at least one embodiment, other types of inputs may be used to compute the AVSS in addition to the ESSs. For example, if the critical attribute is a text attribute as in FIG. 5, a string-similarity score (SS) or text similarity score for the attribute value pair may be computed, and used in combination with the ESSs to compute the AVSS. In one such scenario, the AVSS for the text attribute value pair value1, value2 with a set S1 of ESSs may be computed as the following weighted sum: AVSS (value1, value2)=W1*(mean{ESS(value1, value2)})+ W2*SS(value1, value2). In this formula, W1 and W2 are respective real-number weights which add up to 1, {ESS (value1, value2)} is the set of ESS values obtained from entity record pairs which contain the combination (value1, value2), and SS is a metric of string similarity (e.g., cosine similarity, Jaccard similarity, etc.) between value1 and value2. In embodiments in which non-text attributes are being considered, content comparison techniques/functions other than string similarity algorithms may be used (in addition to the ESSs) to obtain the AVSSs and attribute-pair labels. For example, image similarity scores may be obtained for image attributes, audio similarity scores may be obtained for audio attributes, and video similarity scores may be obtained for video attributes.

Respective AVSSs may be computed using a similar approach for numerous pairs of critical attribute values found in individual TDS clusters in different embodiments. These AVSSs may then be used (e.g., without further transformation, or after applying a transformation function) as labels for the training data set of the attribute-level similarity prediction model used for intra-cluster analysis as discussed above, without requiring annotators or labelers.

Example Machine Learning Model for Attribute-Level Analysis

Figure 6:
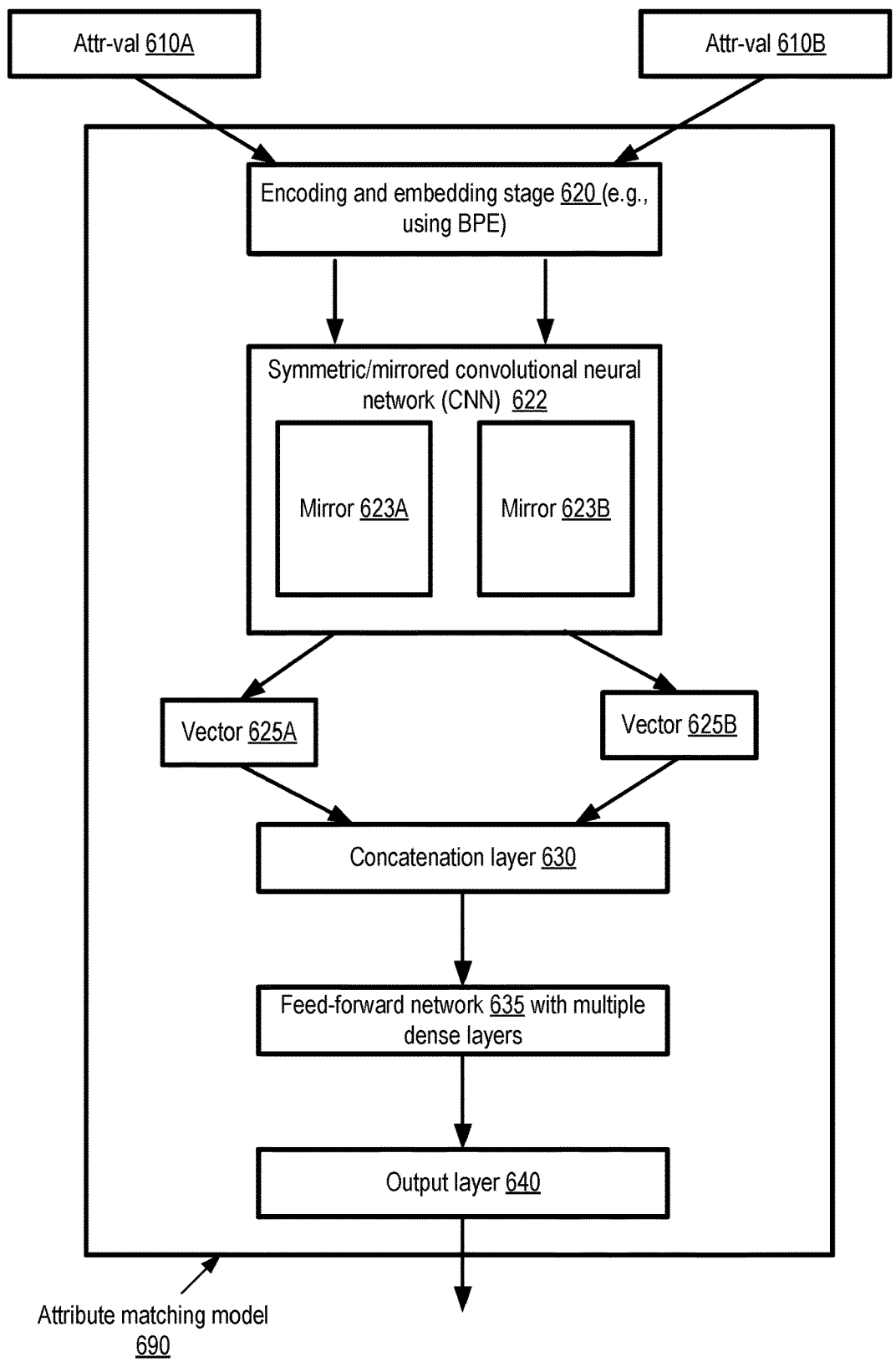
FIG. 6 illustrates aspects of an example machine learning model which may be use to predict attribute-level similarity, according to at least some embodiments.

FIG. 6 illustrates aspects of an example machine learning model which may be use to predict attribute-level similarity, according to at least some embodiments. The attribute matching model 690 (which may also be referred to as an attribute-level similarity prediction model) depicted in FIG. 6 comprises several neural network-based stages, and may be employed for generating similarity scores for a given critical attribute; as such, similar models may be trained for each of several different critical attributes in at least some embodiments. The input to the model 690 comprises automatically-labeled pairs of critical attribute values such as Attr-val 610A and Attr-val 610B. The input attribute values 610 are each assumed to consist of text tokens in the depicted embodiment, although similar models may be employed with equal success for attributes of different data types. Note that the input text may be expressed in any of a variety of languages, or even mixes of different languages in at least some embodiments, as long as the characters/symbols used to express the attribute values belong to an acceptable set of symbols. In some embodiments in which the model 690 is trained at an analytics service similar to service 102 of FIG. 1, the analytics service may provide a list of supported languages/symbols for which attribute matching models can be trained.

In an encoding and embedding stage 620, the attribute values 610 may first be provided as input to a tokenizer. Any of a variety of tokenization schemes may be implemented in different embodiments, including for example byte-pair encoding (BPE). In byte pair encoding, the individual tokens or words of the attribute value may be identified and counted, and the most frequently represented byte pairs (e.g., with each byte corresponding to a character) in the tokens may be identified using an iterative technique. The tokenizer output may comprise sub-word tokens, which are then passed to an embedding matrix. The embedding operation may convert the sub-word token sequences into two-dimensional tensors or vectors in the depicted embodiment.

The output of the embedding stage 620 may be provided as input to a symmetric/mirrored convolutional neural network 622 (which may sometimes be referred to as a Siamese network) in various embodiments, with parameters being shared among two mirrored sub-networks, mirror 623A and mirror 623B. A given mirror 623 may comprise several layers, such as one or more convolution layers with multiple filter widths and feature maps, followed by one or more pooling layers, one or more fully connected layers with dropout and softmax output, and so on, in the depicted embodiment.

Respective vectors 625A and 625B may be generated by the symmetric CNN 622, and concatenated at concatenation layer 630 of the attribute matching model 690. The concatenation result may be propagated through a feed forward network 635 comprising some number of dense layers—e.g., with a sequence of 128, 128, 64 and 1 neurons per dense layer in some implementations. The output layer 640 may provide a linear activation output indicating the predicted/learned similarity score in at least some embodiments.

Other types of machine learning models may be trained in different embodiments for attribute matching—e.g., for non-text attributes, different types of encoding/embedding techniques may be used, the internal structure of the convolutional networks may differ, and so on. In at least one embodiment, models which do not use neural networks may be used for attribute-level similarity prediction. In some embodiments, clients on whose behalf the attribute matching model is being trained at an analytics service may provide values of one or more hyper-parameters of the model to the analytics service via programmatic interfaces. For example, a client may indicate the types of tokenization, embedding or encoding techniques to be used for transforming one or more critical attributes, the type of model to be used for each attribute, details regarding the number and types of layers of neural networks if neural networks are to be used, the loss functions of the models, and so on. In other embodiments, the analytics service may determine/select such hyper-parameters without specific guidance from the client, e.g., using a knowledge base which includes records describing earlier instances of clustering and post-clustering analysis.

Example Programmatic Interactions

Figure 7:
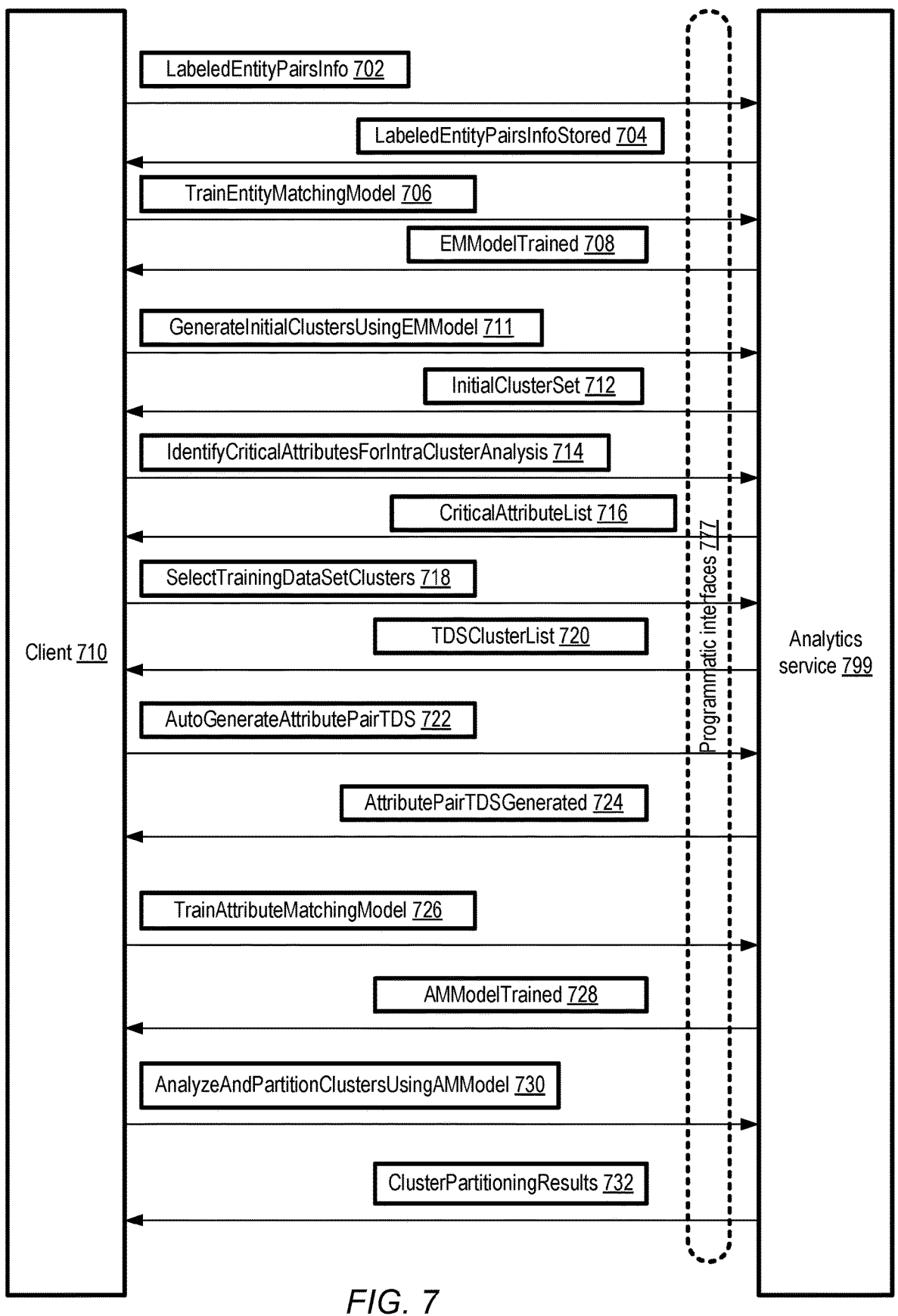
FIG. 7 illustrates example programmatic interactions pertaining to transfer learning based attribute-level analysis of clusters at an analytics service, according to at least some embodiments.

FIG. 7 illustrates example programmatic interactions pertaining to transfer learning based attribute-level analysis of clusters at an analytics service, according to at least some embodiments. An analytics service 799, similar in features and functionality to analytics service 102 of FIG. 1, may implement a set of programmatic interfaces 777 in the depicted embodiment. The programmatic interfaces may include, for example, one or more web-based consoles, a set of application programming interfaces (APIs), command line tools, graphical user interfaces, and the like. Using the programmatic interfaces 777, a client 710 of the analytics service may submit a LabeledEntityPairsInfo message 702 indicating a data set comprising labeled entity record pairs which can be used to train an entity-level similarity prediction model in the depicted embodiment. The information about the labeled entity pairs may be stored, e.g., at a metadata repository maintained by the analytics service 799, and a LabeledEntityPairsInfoStored response message 704 may be sent to the client.

A TrainEntityMatchingModel request 706 may be sent by the client via programmatic interfaces 777 in the depicted embodiment. The receipt of this message may cause the analytics service 799 to train the entity matching model using the labeled entity pairs indicated earlier by the client. The analytics service 799 may use any of a variety of algorithms for the entity matching model, e.g., including neural network based algorithms, decision-tree based algorithms such as XGBoost, and so on; in some cases, the client may specify the algorithm and/or algorithm hyper-parameters in the request 706. After the entity matching model has been trained, an EMModelTrained message 708 may be sent to the client in some embodiments.

The client 710 may submit a GenerateInitialClustersUsingEMModel request 711 in some embodiments, indicating that an initial set of clusters is to be identified from a specified collection of entity records using the trained version of the entity matching model. The receipt of this message may in cause the analytics service 799 to run a clustering algorithm (e.g., a spanning-tree based algorithm of the kind mentioned above, a connected components-based algorithm, etc.) to generate an initial set of clusters from the specified collection of entity records. In some cases, the particular clustering algorithm to be used, and/or hyper-parameters of the algorithm, may be specified by the client via the programmatic interfaces 777. An indication of the set of clusters identified may be provided to the client in an InitialClusterSet message 712 from the analytics service 799 in at least some embodiments.

In some embodiments, the client 710 may send an IdentifyCriticalAttributesForIntraClusterAnalysis request 714 via programmatic interfaces 777. In response, the analytics service may analyze records of changes to the set of attributes included in the collection of entity records over time, records of earlier decisions to partition clusters based on identified cases of non-duplicate entries within a given cluster, historical records of errors detected in clustering/deduplication efforts for the problem domain, and use the results of such analysis to propose a set of candidate critical attributes, which are deemed suitable for training an attribute-level model for intra-cluster analysis, to the client. The changes in the set of attributes used to model real world entities over time may provide clues as to which attributes have gradually become more important for distinguishing among entities, and may therefore be more likely candidates for being considered critical attributes. Such proposed critical attributes may be sent to the client 710 in a CriticalAttributeList message 716 in some embodiments. In at least some embodiments, the client may send a message approving at least some of the proposed critical attributes to the analytics service, and/or indicate one or more alternative critical attributes to be used for intra-cluster analysis. In one embodiment, the analytics service may not be required to identify proposed critical attributes; instead, the client may send one or more other messages (not shown in FIG. 7) to specify one or more critical attributes for which respective attribute matching models are to be trained for intra-cluster analysis.

In the embodiment depicted in FIG. 7, the client 710 may submit a SelectTrainingDataSetClusters message 718 to the analytics service. In response, one or more training-data-source (TDS) clusters may be identified from the initial set of clusters indicated in message 712. Any of a number of techniques may be employed to select clusters from which training data for the attribute-level similarity prediction model(s) in various embodiments. For example, the TDS clusters may be identified based at least in part on an expected intra-cluster divergence criterion, or a cluster-level property, specified via programmatic interfaces 777 by the client or chosen by the analytics service. In one implementation, for example, cluster size (the total number of entity records in a cluster) may indicate the probability that the cluster contains divergent entity records (entity records which do not represent the same real-world entity). In such an implementation, clusters smaller than a selected threshold size may be assumed to be pure and hence acceptable candidates for extracting training data, while clusters larger than the selected threshold size may be considered more likely to be impure (and may hence not be selected as TDS clusters). The set of TDS clusters may be indicated to the client 710 in a TDSClusterList message 720 in some embodiments.

A client 710 may submit an AutoGenerateAttributePairTDS message 722 via programmatic interfaces 777 in various embodiments. In response, an automatically labeled collection of attribute value pairs for one or more critical attributes may be generated using transfer learning at the analytics service. As discussed earlier, the analytics service may identify pairs of entity records within the TDS clusters, extract attribute value pairs from the entity record pairs, and use entity level similarity scores (obtained from the already-trained entity matching model) to generate attribute-level similarity scores and labels. The analytics service may send an AttributePairTDSGenerated message 724 to the client 710 after the automatically-labeled training data for an attribute-level similarity analysis model has been generated in at least some embodiments.

The client 710 may send a request to train one or more attribute-level models to the analytics service 799, e.g., in the form of respective TrainAttributeMatchingModel requests 726 in the depicted embodiment. In response to such a message, the analytics service 799 may use the appropriate labeled attribute pair training data set to train a model (e.g., a neural network-based model of the kind illustrated in FIG. 6) to generate similarity scores for attribute value pairs. After the attribute-level similarity prediction model has been trained, an AMModelTrained message 728 may be sent to the client 710 in at least some embodiments.

In at least some embodiments, a client 710 may send an AnalyzeAndPartitionClustersUsingAMModel message 730 to the analytics service via the programmatic interfaces 777. In response to receiving such a message, the analytics service 799 may use the trained attribute matching model to analyze various clusters, and subdivide one or more clusters if the model indicates that the clusters contain entity records which do not appear to represent the same real-world entities. A ClusterPartitioningResults messages 732 may be sent to the client 710 indicating the results of the analysis. In at least some embodiments, programmatic interactions other than those shown in FIG. 7 may be supported by an analytics service which performs transfer learning based intra-cluster analysis.

Example Provider Network Environment

Figure 8:
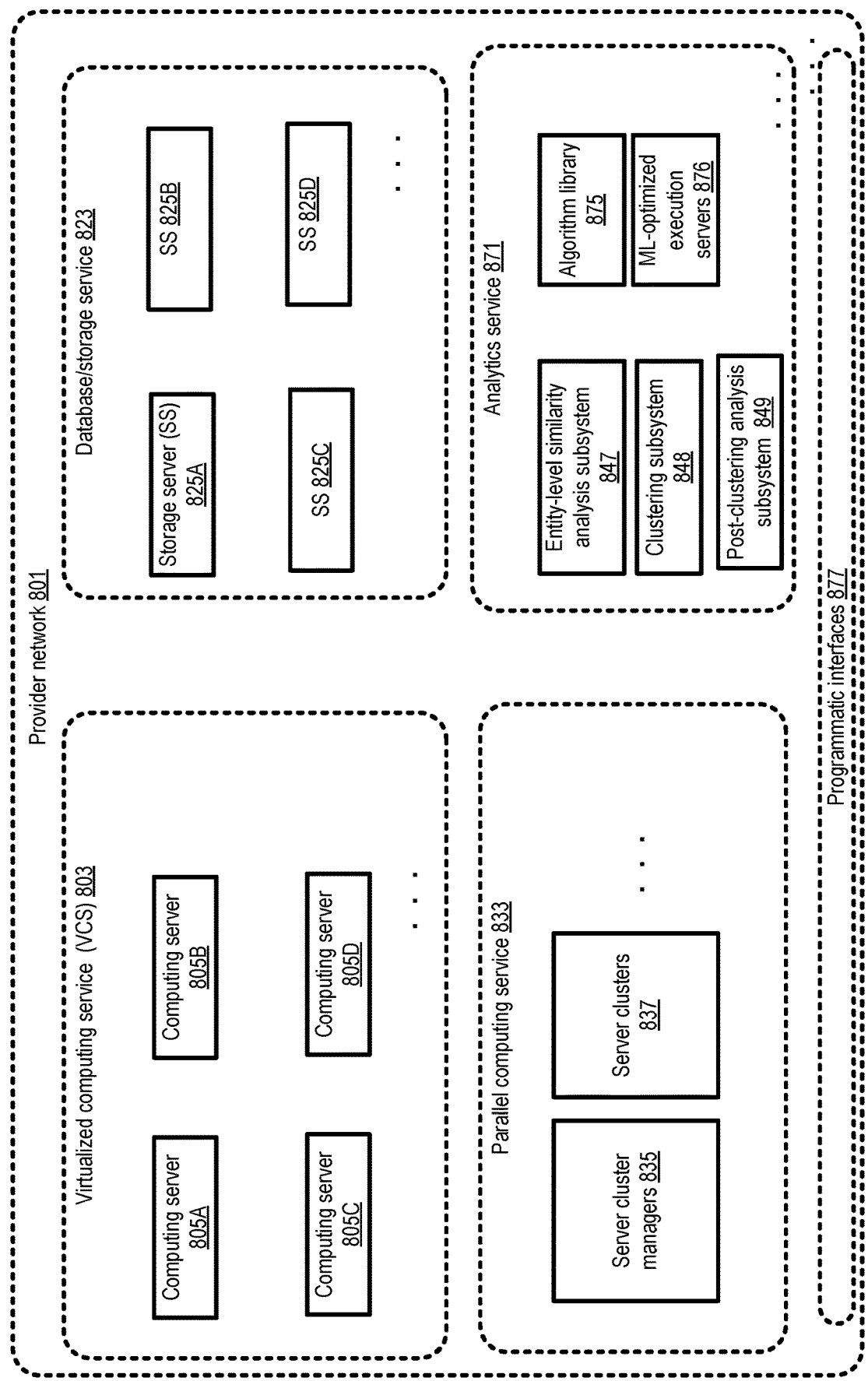
FIG. 8 illustrates an example provider network environment in which an analytics service may be implemented, according to at least some embodiments.

In some embodiments, as mentioned earlier, an analytics service at which transfer learning based intra-cluster analysis is performed may be implemented at a provider network. FIG. 8 illustrates an example provider network environment in which an analytics service may be implemented, according to at least some embodiments. In the depicted embodiment, provider network 801 may comprise resources used to implement a plurality of services, including for example a virtualized computing service (VCS) 803, a database/storage service 823, and a parallel computing service 833 as well as an analytics service 871 similar in features and capabilities to analytics service 102 of FIG. 1. The analytics service 871 in turn may comprise at least an entity-level similarity analysis subsystem 847 (used for generating similarity scores for entity record pairs), a clustering subsystem 848 responsible for identifying clusters from entity record collections, and a post-clustering analysis subsystem 849 at which the transfer-learning based intra-cluster analysis techniques discussed introduced earlier may be implemented. In at least some cases, machine learning models of an algorithm library 875, implemented at a set of machine-learning-optimized execution servers 876, may be employed for various tasks at subsystems 847, 848 and 849. The parallel computing service 833 may comprise various server clusters 837, each comprising a plurality of servers, on which parallelizable workloads may be distributed by a set of server cluster managers 835 in the depicted embodiment. Some of the algorithms implemented at the analytics service may be parallelizable, and may utilize the server clusters 837 in at least some embodiments.

Components of a given service may utilize components of other services in the depicted embodiment—e.g., for some analytics service tasks, virtual machines implemented at computing servers such as 805A-805D of the virtualized computing service 803 may be used, server clusters 837 and/or cluster managers 835 may be utilized for parallelizable computations of the analytics service, input data and/or output produced at the analytics service may be stored at storage servers 825 (e.g., 825A-825D) of storage service 823, and so on. Individual ones of the services shown in FIG. 8 may implement a respective set of programmatic interfaces 877 which can be used by external and/or internal clients (where the internal clients may comprise components of other services) in the depicted embodiment.

In some embodiments, at least some aspects of the transfer learning based intra-cluster analysis may be implemented without acquiring resources of network-accessible services such as those shown in FIG. 8. For example, a standalone tool implemented at one or more computing devices which are not part of a network-accessible service may be used in one embodiment.

Use Cases

The techniques described above, of using transfer learning to help identify clusters which comprise divergent records representing different real-world objects, may be useful in a variety of scenarios. For example, such techniques may be used to ensure that customer records identified as duplicates actually do represent duplicate customers for various types of organizations, to distinguish patients suffering from similar but distinct ailments in the health-care domain, and so on. In the store domain, the proposed techniques may be used to enhance the quality of search results, to organize products of a catalog appropriately, and so on.

Illustrative Computer System

Figure 9:
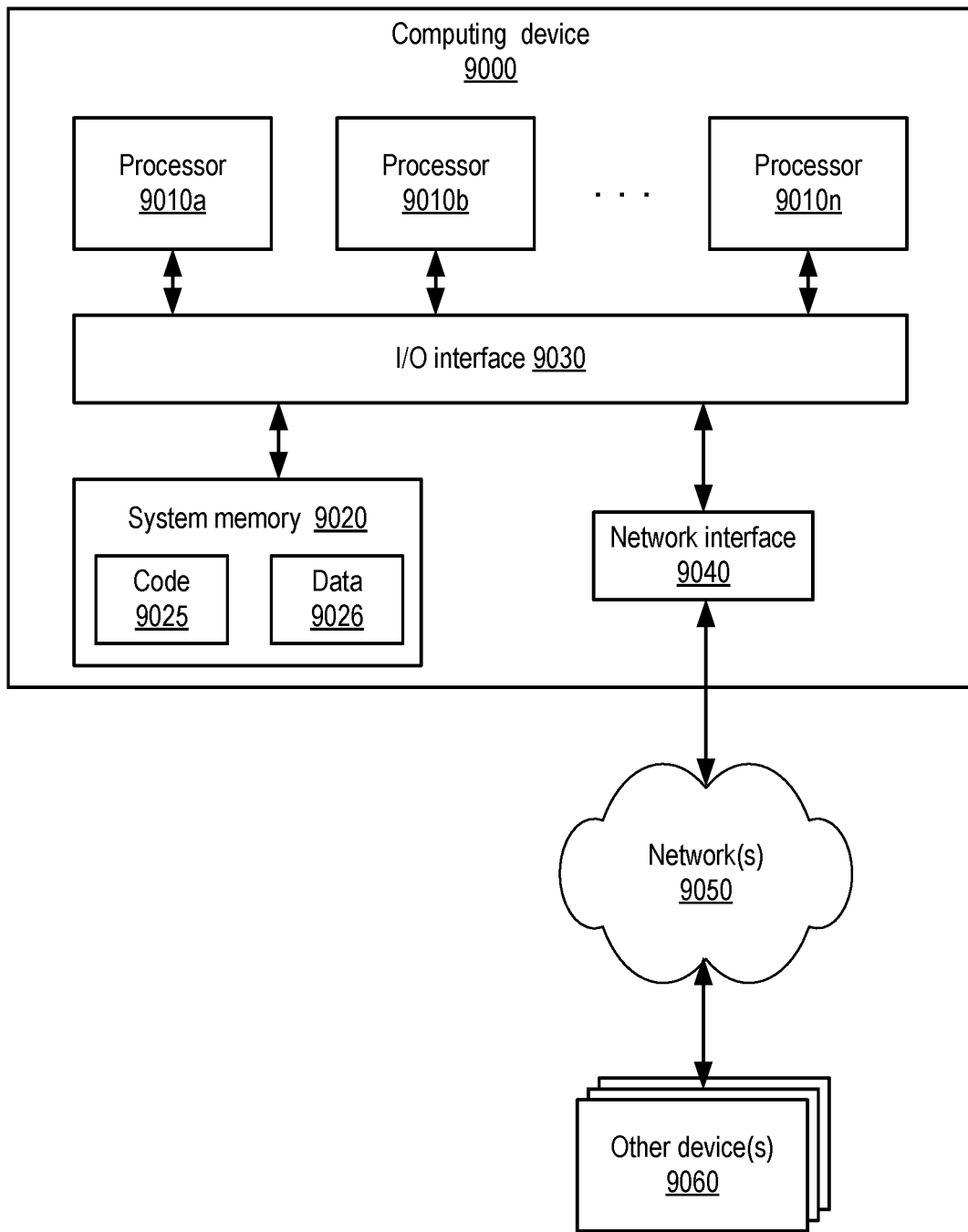
FIG. 9 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  one or more computing devices;
  wherein the one or more computing devices include instructions that upon execution on or across the one or more computing devices cause the one or more computing devices to:
    train, using a labeled data set, a first machine learning model to generate similarity scores for pairs of entity records, wherein individual entity records comprise respective values for a plurality of attributes including at least a first text attribute;
    select, from a plurality of clusters of entity records, at least a first training-data-source cluster based at least in part on an expected intra-cluster divergence criterion, wherein the entity records of individual ones of the clusters satisfy an intra-cluster similarity criterion;
    generate, from the first training-data-source cluster, a first collection of entity record pairs and a corresponding second collection of attribute value pairs, wherein an individual attribute value pair corresponding to a particular entity record pair comprises (a) a value of the first text attribute from a first entity record of the particular entity record pair and (b) a value of the first text attribute from a second entity record of the particular entity record pair;
    compute, based at least in part a respective similarity score obtained from a trained version of the first machine learning model for one or more entity record pairs of the first collection of entity record pairs, a respective attribute similarity score for individual ones of the second collection of attribute value pairs;
    automatically assign, without utilizing a labeler, a label to individual ones of the attribute value pairs of the second collection, wherein the label is based at least in part on the respective attribute similarity score of the attribute value pair;
    train a second machine learning model, using a training data set comprising labeled attribute value pairs of the second collection, to predict attribute similarity scores corresponding to pairs of values of the first text attribute; and
    partition a particular cluster of entity records into a plurality of sub-clusters based at least in part on an attribute similarity score generated by a trained version of the second machine learning model for a pair of entity records of the particular cluster.

2. The system as recited in claim 1, wherein the second machine learning model comprises one or more neural networks.

3. The system as recited in claim 1, wherein the one or more computing devices include further instructions that upon execution on or across the one or more computing devices further cause the one or more computing devices to:
obtain, via one or more programmatic interfaces, an indication of the expected intra-cluster divergence criterion.

4. The system as recited in claim 1, wherein the one or more computing devices include further instructions that upon execution on or across the one or more computing devices further cause the one or more computing devices to:
obtain, via one or more programmatic interfaces, an indication of a plurality of attributes for which respective machine learning models are to be trained to predict attribute-level similarity scores, including the first text attribute and a second attribute; and
train, using another training data set comprising automatically assigned labels for pairs of values of the second attribute, a third machine learning model to predict attribute similarity scores for pairs of values of the second attribute, wherein the automatically assigned labels for pairs of values of the second attribute are based at least in part on output of the trained version of the first machine learning model.

5. The system as recited in claim 1, wherein the one or more computing devices include further instructions that upon execution on or across the one or more computing devices further cause the one or more computing devices to:
cause to be presented, via one or more programmatic interfaces, an indication of a set of candidates attributes for training the second machine learning model, including the first text attribute and a second attribute of the plurality of attributes; and
obtain an indication, via the one or more programmatic interfaces, that the first text attribute has been selected to train the second machine learning model.

6. A computer-implemented method, comprising:
identifying, from a plurality of clusters of entity records, at least a first training-data-source cluster based at least in part on a first cluster-level property, wherein entity records of individual clusters of the plurality of clusters satisfy an intra-cluster similarity criterion;
determining, from the first training-data-source cluster, a plurality of entity record pairs, wherein individual ones of the entity record pairs comprise (a) a first entity record comprising at least a first attribute and (b) a second entity record comprising at least the first attribute;
obtaining, from the plurality of entity record pairs, a corresponding plurality of attribute value pairs, wherein an attribute value pair obtained from a particular entity record pair comprises (a) a value of the first attribute of a first entity record of the particular entity record pair and (b) a value of the first attribute of a second entity record of the particular entity record pair;
assigning a label to individual ones of the plurality of attribute value pairs, wherein the label of a particular attribute value pair is based at least in part on an entity-level similarity score assigned by a first machine learning model to an entity record pair from which the particular attribute value pair is obtained; and
training a second machine learning model, using a training data set comprising at least some labeled attribute value pairs of the plurality of attribute value pairs, to generate attribute similarity scores corresponding to pairs of values of at least the first attribute.

7. The computer-implemented method as recited in claim 6, wherein the second machine learning model comprises one or more neural networks.

8. The computer-implemented method as recited in claim 6, wherein the cluster-level property is a cluster size, and wherein said identifying the first training-data-source cluster comprises determining that the first training-data-source cluster comprises fewer than a threshold number of entity records.

9. The computer-implemented method as recited in claim 6, further comprising:
obtaining, via one or more programmatic interfaces, an indication of a criterion for identifying a training-data-source cluster from the plurality of clusters.

10. The computer-implemented method as recited in claim 6, wherein individual entity records of the training-data-source cluster comprise a plurality of attributes including a second attribute, the computer-implemented method further comprising:
obtaining, via one or more programmatic interfaces, an indication that the training data set for the second machine learning model is to include values of pairs of the first attribute.

11. The computer-implemented method as recited in claim 6, wherein the first attribute comprises one or more of: (a) text content, (b) image content, (c) video content, or (d) audio content.

12. The computer-implemented method as recited in claim 6, wherein the label of the particular attribute value pair is based at least in part on output of a content comparison function.

13. The computer-implemented method as recited in claim 6, wherein said training the second machine learning model comprises applying a byte-pair encoding algorithm to values of the first attribute.

14. The computer-implemented method as recited in claim 6, wherein individual entity records of the training-data-source cluster comprise a plurality of attributes, the computer-implemented method further comprising:
selecting the first attribute from the plurality of attributes as an attribute to be included in input to the second machine learning model, wherein said selecting is based at least in part on analyzing changes, over time, in the attributes which are included in the plurality of attributes.

15. The computer-implemented method as recited in claim 6, further comprising:
obtaining a training request for an intra-cluster analysis model via a programmatic interface of a provider network, wherein the training of the second machine learning model is initiated in response to the training request.

16. One or more non-transitory computer-accessible storage media storing program instructions that when executed on or across one or more processors cause the one or more processors to:
extract, from a first training-data-source cluster selected from a plurality of clusters of entity records, a plurality of entity record pairs, wherein individual ones of the entity record pairs comprise (a) a first entity record comprising at least a first attribute and (b) a second entity record comprising at least the first attribute;

obtain, from the plurality of entity record pairs, a corresponding plurality of attribute value pairs, wherein an attribute value pair obtained from a particular entity record pair comprises (a) a value of the first attribute of a first entity record of the particular entity record pair and (b) a value of the first attribute of a second entity record of the particular entity record pair;

assign a label to individual ones of the plurality of attribute value pairs, wherein the label of a particular attribute value pair is based at least in part on an entity-level similarity score of an entity record pair from which the particular attribute value pair is obtained; and train a first machine learning model, using a training data set comprising at least some labeled attribute value pairs of the plurality of attribute value pairs, to generate attribute similarity scores corresponding to pairs of values of at least the first attribute.

17. The one or more non-transitory computer-accessible storage media as recited in claim 16, storing further program instructions that when executed on or across one or more processors further cause the one or more processors to:

initiate a partitioning of a particular cluster of entity records, based at least in part on an analysis of output generated by a trained version of the first machine learning model, wherein the output indicates that an attribute similarity score of at least one attribute value pair of the particular cluster is below a threshold.

18. The one or more non-transitory computer-accessible storage media as recited in claim 16, wherein the first machine learning model comprises a symmetric convolutional neural network.

19. The one or more non-transitory computer-accessible storage media as recited in claim 16, storing further program instructions that when executed on or across one or more processors further cause the one or more processors to:

obtain, via one or more programmatic interfaces, respective values of one or more hyper-parameters of the first machine learning model.

20. The one or more non-transitory computer-accessible storage media as recited in claim 16, storing further program instructions that when executed on or across one or more processors further cause the one or more processors to:

select one or more training-data-source clusters, including the first training-data-source cluster, from a plurality of clusters based at least in part on a criterion indicated via one or more programmatic interfaces.

* * * * *